US012177465B2

(12) United States Patent
Chujoh et al.

(10) Patent No.: US 12,177,465 B2
(45) Date of Patent: *Dec. 24, 2024

(54) IMAGE CODING METHOD, IMAGE DECODING METHOD, IMAGE CODING APPARATUS, AND IMAGE DECODING APPARATUS

(71) Applicant: KABUSHIKI KAISHA TOSHIBA, Tokyo (JP)

(72) Inventors: Takeshi Chujoh, Kanagawa (JP); Tomoo Yamakage, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,305

(22) Filed: Oct. 17, 2023

(65) Prior Publication Data

US 2024/0048746 A1 Feb. 8, 2024

Related U.S. Application Data

(63) Continuation of application No. 17/884,635, filed on Aug. 10, 2022, now Pat. No. 11,831,891, which is a (Continued)

(51) Int. Cl.
*G06K 9/36* (2006.01)
*G06T 9/00* (2006.01)
(Continued)

(52) U.S. Cl.
CPC ............. *H04N 19/44* (2014.11); *G06T 9/004* (2013.01); *H04N 19/117* (2014.11);
(Continued)

(58) Field of Classification Search
CPC ........ H04N 19/44; H04N 19/50; H04N 19/51; H04N 19/52; H04N 19/59; H04N 19/103;
(Continued)

(56) References Cited

U.S. PATENT DOCUMENTS 7,555,043 B2 6/2009 Sato et al.
7,742,648 B2 6/2010 Sato et al.
(Continued)

FOREIGN PATENT DOCUMENTS

AU 2010228415 A1 10/2011
CN 101087414 A 12/2007
(Continued)

OTHER PUBLICATIONS

International Search Report issued on Jan. 24, 2012 for PCT/JP2011/075725 filed on Nov. 8, 2011 with English Translation.
(Continued)

*Primary Examiner* — Duy M Dang
(74) *Attorney, Agent, or Firm* — Oblon, McClelland, Maier & Neustadt, L.L.P.

(57) ABSTRACT

According to an embodiment, an image coding method is for coding an image including a luminance component and color difference components. The method includes acquiring a reference image; and generating a predicted image by interpolating the luminance component and the color difference components in the reference image according to a motion vector. If a size of a block, which is designated as a unit of the interpolation, is equal to or smaller than a predetermined first threshold value, the generating includes inhibiting a bi-directional prediction, and performing only a uni-directional prediction to generate the predicted image according to the motion vector.

1 Claim, 13 Drawing Sheets

Related U.S. Application Data continuation of application No. 16/866,249, filed on May 4, 2020, now Pat. No. 11,451,808, which is a continuation of application No. 16/659,221, filed on Oct. 21, 2019, now Pat. No. 10,687,072, which is a continuation of application No. 15/688,541, filed on Aug. 28, 2017, now Pat. No. 10,554,991, which is a continuation of application No. 15/449,394, filed on Mar. 3, 2017, now Pat. No. 9,843,818, which is a continuation of application No. 14/693,629, filed on Apr. 22, 2015, now Pat. No. 9,672,633, which is a continuation of application No. 14/026,465, filed on Sep. 13, 2013, now Pat. No. 9,135,717, which is a continuation of application No. PCT/JP2011/075725, filed on Nov. 8, 2011.

(51) Int. Cl.

| | |
|---|---|
| *H04N 19/117* | (2014.01) |
| *H04N 19/136* | (2014.01) |
| *H04N 19/137* | (2014.01) |
| *H04N 19/186* | (2014.01) |
| *H04N 19/44* | (2014.01) |
| *H04N 19/513* | (2014.01) |
| *H04N 19/52* | (2014.01) |
| *H04N 19/523* | (2014.01) |
| *H04N 19/59* | (2014.01) |
| *H04N 19/567* | (2014.01) |

(52) U.S. Cl.
CPC ......... *H04N 19/136* (2014.11); *H04N 19/137* (2014.11); *H04N 19/186* (2014.11); *H04N 19/513* (2014.11); *H04N 19/52* (2014.11); *H04N 19/523* (2014.11); *H04N 19/59* (2014.11); *H04N 19/567* (2014.11)

(58) Field of Classification Search
CPC .. H04N 19/105; H04N 19/117; H04N 19/136; H04N 19/137; H04N 19/159; H04N 19/186; H04N 19/513; H04N 19/577; H04N 9/8045; H04N 9/8082; G06T 9/00; G06T 9/004

See application file for complete search history.

(56) References Cited

U.S. PATENT DOCUMENTS

| | | | |
|---|---|---|---|
| 8,565,307 B2 | 10/2013 | Matsuda et al. | |
| 9,135,717 B2 | 9/2015 | Chujoh | |
| 9,672,633 B2 | 6/2017 | Chujoh | |
| 9,843,818 B2 | 12/2017 | Chujoh | |
| 11,451,808 B2 | 9/2022 | Chujoh | |
| 11,831,891 B2 * | 11/2023 | Chujoh | H04N 19/59 |
| 2004/0247190 A1 | 12/2004 | Hagai et al. | |
| 2006/0188024 A1 | 8/2006 | Suzuki et al. | |
| 2007/0121731 A1 | 5/2007 | Tanizawa et al. | |
| 2007/0217512 A1 | 9/2007 | Matsuda et al. | |
| 2007/0286284 A1 | 12/2007 | Ito et al. | |
| 2009/0097557 A1 | 4/2009 | Takahashi et al. | |
| 2010/0086027 A1 | 4/2010 | Panchal et al. | |
| 2011/0090966 A1 | 4/2011 | Chujoh et al. | |
| 2012/0294368 A1 | 11/2012 | Kondo et al. | |
| 2015/0312588 A1 | 10/2015 | Yamamoto et al. | |
| 2017/0359592 A1 | 12/2017 | Chujoh | |

FOREIGN PATENT DOCUMENTS

| | | |
|---|---|---|
| JP | 2001-045491 A | 2/2001 |
| JP | 2003-169337 | 6/2003 |
| JP | 2003-219426 | 7/2003 |
| JP | 4120301 | 5/2008 |
| JP | 2011-135184 | 7/2011 |
| KR | 10-2006-0055583 | 5/2006 |
| KR | 10-2011-0063864 | 6/2011 |
| WO | WO 2006/082690 A1 | 8/2006 |
| WO | WO 2010/039731 A2 | 4/2010 |
| WO | WO 2010/070818 A | 6/2010 |
| WO | WO 2011/047994 A1 | 4/2011 |
| WO | WO 2012/172659 A1 | 12/2012 |
| WO | WO 2013/047811 A | 4/2013 |
| WO | WO 2013/065431 A1 | 5/2013 |

OTHER PUBLICATIONS

International Wrriten Opinion issued on Jan. 24, 2012 for PCT/JP2011/075725 filed on Nov. 8, 2011.
Kondo et al.; "Memory bandwidth reduction MC filter"; Joint Collaborative Team on Video Coding Contribution (JCT-VC) of ITU-T SG16 WP3 and ISO/IEC JTC1/SC29/WG11; Document: JCTVC-E129; 5th Meeting: Geneva, CH, Mar. 16-23, 2011.
Australian Office Action issued Nov. 20, 2014, in Australian Patent Application No. 2011380761.
Japanese Office Action issued Sep. 30, 2014 in Patent Application No. 2013-542736 (with English Translation).
Benjamin Bross et al., "WD4: Working Draft 4 of High-Efficiency Video Coding", Joint Collaborative Team on Video Coding (JCT-VC) of ITU-T SG 16 WP3 and ISO/IEC JTC1/SC29/WG11 JCTVC-F803_d2, ITU-T, Oct. 4, 2011, pp. 55 and Cover page.
Office Action issued Feb. 17, 2015 in Japanese Patent Application No. 2013-542736 (with English translation).
Korean Office Action issued Jan. 9, 2015, in Korea Patent Application No. 10-2014-7005036 (with English translation).
Korean Office Action mailed on May 26, 2015 in corresponding Korean appln. No. 10-2014-7005036, with English translation (9 pages).
Korean Office Action mailed on May 14, 2015 in corresponding Korean appln. No. 10-2015-7005970, with English translation, (10 pages).
Extended European Search Report issued Jul. 13, 2015 in Patent Application No. 11875421.7.
Hung-Chih Lin, et al., "Fast Temporal Prediction Selection for H.264/AVC Scalable Video Coding" International Conference on Image Processing (ICIP), XP031628532, Nov. 7, 2009, pp. 3425-3428.
Ehsan Maani, et al., "CE6: Differential Coding of Intra Modes" Joint Collaborative Team on Video Coding (JCT-VC) of ITU-T SG16 WP3 and ISO/IEC JTC1/SC29/WG11, XP030009589, Jul. 14-22, 2011, pp. 1-16.
Office Action issued on Aug. 20, 2015 in Russian Patent Application No. 2014107468 with English translation.
Office Action issued Oct. 5, 2015 in Patent Application No. 10-2014-7005036 (with English Translation).
Office Action Issued Feb. 5, 2016 in Canadian Patent Application No. 2,847,301.
Office Action issued Apr. 20, 2016 in Australian Patent Application No. 2015213328.
Office Action issued Apr. 20, 2016 in European Patent Application No. 11 875 421.7.
Office Action issued May 3, 2016 in Korean Patent Application No. 10-2016-7003825 (with English language translation).
Combined Office Action and Search Report issued May 30, 2016 in Chinese Patent Application No. 201180073088.4 (with English language translation).
Office Action issued Jun. 21, 2016 in Japanese Patent Application No. 2015-066225 (with unedited computer generated English language translation).
Benjamin Bross, et al., "WD4: Working Draft 4 of High-Efficiency Video Coding" Joint Collaborative Team on Video Coding (JCT-VC) of ITU-T SG16 WP3 and ISO/IEC JTC1/SC29/WG11, Document: JCTVC-F803_d2, Jul. 14-22, 2011, 223 Pages.

* cited by examiner

FIG.2

| | | |
|---|---|---|
| nPSW, Y, nPSH | MONO-CHROME | chroma_format_idc=0 |
| Y, Cb, Cr | 4:2:0 | chroma_format_idc=1 |
| Y, Cb, Cr | 4:2:2 | chroma_format_idc=2 |
| Y, Cr, Cb | 4:4:4 | chroma_format_idc=3 |

IMAGE CODING METHOD, IMAGE DECODING METHOD, IMAGE CODING APPARATUS, AND IMAGE DECODING APPARATUS

CROSS-REFERENCE TO RELATED APPLICATIONS

This application is a continuation of and claims benefit under 35 U.S.C. § 120 to U.S. application Ser. No. 17/884,635, filed Aug. 10, 2022, which is a continuation of and claims benefit under 35 U.S.C. § 120 to U.S. application Ser. No. 16/866,249 (now U.S. Pat. No. 11,451,808), filed on May 4, 2020, which is a continuation of and claims benefit under 35 U.S.C. § 120 to U.S. application Ser. No. 16/659,221 (now U.S. Pat. No. 10,687,072), filed on Oct. 21, 2019, which is a continuation of and claims benefit under 35 U.S.C. § 120 to U.S. application Ser. No. 15/688,541 (now U.S. Pat. No. 10,554,991), filed on Aug. 28, 2017, which is a continuation of and claims benefit under 35 U.S.C. § 120 to U.S. application Ser. No. 15/449,394 (now U.S. Pat. No. 9,843,818), filed on Mar. 3, 2017, which is a continuation of and claims benefit under 35 U.S.C. § 120 to U.S. application Ser. No. 14/693,629 (now U.S. Pat. No. 9,672,633), filed on Apr. 22, 2015, which is a continuation of and claims benefit under 35 U.S.C. § 120 to U.S. application Ser. No. 14/026,465 (now U.S. Pat. No. 9,135,717), filed on Sep. 13, 2013, which is a continuation of and claims benefit under 35 U.S.C. § 120 to PCT Application No. PCT/JP2011/075725, filed on Nov. 8, 2011, which designates the United States, the entire contents of each of which are incorporated herein by reference.

FIELD

Embodiments described herein relate generally to an image coding method, an image decoding method, an image coding apparatus, and an image decoding apparatus.

BACKGROUND

In a technique of video coding and decoding, a motion-compensated interpolation for each block is generally executed. An image signal to be referred is stored in an external memory; therefore, when the video coding and decoding is implemented by hardware, there might be constraints on the amount of read data. Accordingly, when an amount of access to the memory increases, a so-called memory bandwidth, which is a bottleneck in the coding and decoding operations, becomes a problem.

In the motion-compensated interpolation for each block, an interpolation filtering process using FIR (Finite Impulse Response) filter in the horizontal direction and in the vertical direction is executed. In the interpolation filtering process, a pixel outside the block has to be accessed. When the number of pixels outside the block increases, the memory bandwidth per pixel also increases.

Conventionally, the memory bandwidth per pixel has been reduced by applying an interpolation filter with a short tap length to a block with a small size by which the ratio of the accessed pixels outside the block relatively increases.

However, in the conventional art, the memory bandwidth cannot appropriately be reduced. For example, in the case of the chroma format, such as 4:2:0 or 4:2:2, in which the number of samples of the pixel for a color difference (color difference component) is smaller than the number of samples of the pixel for luminance (luminance component), and the resolution is low, the interpolation has to be executed in such a manner that the color difference is enlarged more with the luminance being defined as a reference. Therefore, when the filter with taps longer than two taps is used for the interpolation for the color difference, the process for the color difference signal cannot be restricted, even if the process is changed per luminance block.

BRIEF DESCRIPTION OF THE DRAWINGS

FIG. 2 is a view illustrating one example of chroma format information;

DETAILED DESCRIPTION

According to an embodiment, an image coding method is for coding an image including a luminance component and two color difference components. The method includes acquiring a reference image; and generating a predicted image by interpolating the luminance component and the two color difference components in the reference image according to a motion vector. When a size of a block, which is designated as a unit of the interpolation, is equal to or smaller than a predetermined first threshold value, the generating includes inhibiting a bi-directional prediction, and performing only a uni-directional prediction to generate the predicted image according to the motion vector.

Embodiments will be described below in detail with reference to the accompanying drawings.

The image coding apparatus and the image decoding apparatus according to the present embodiment make a control by referring to chroma format information so that a position of a pixel indicated by a motion vector in a block having a size smaller than a predetermined size is not subject to an interpolation for a color difference, thereby reducing a memory bandwidth.

Figure 1:
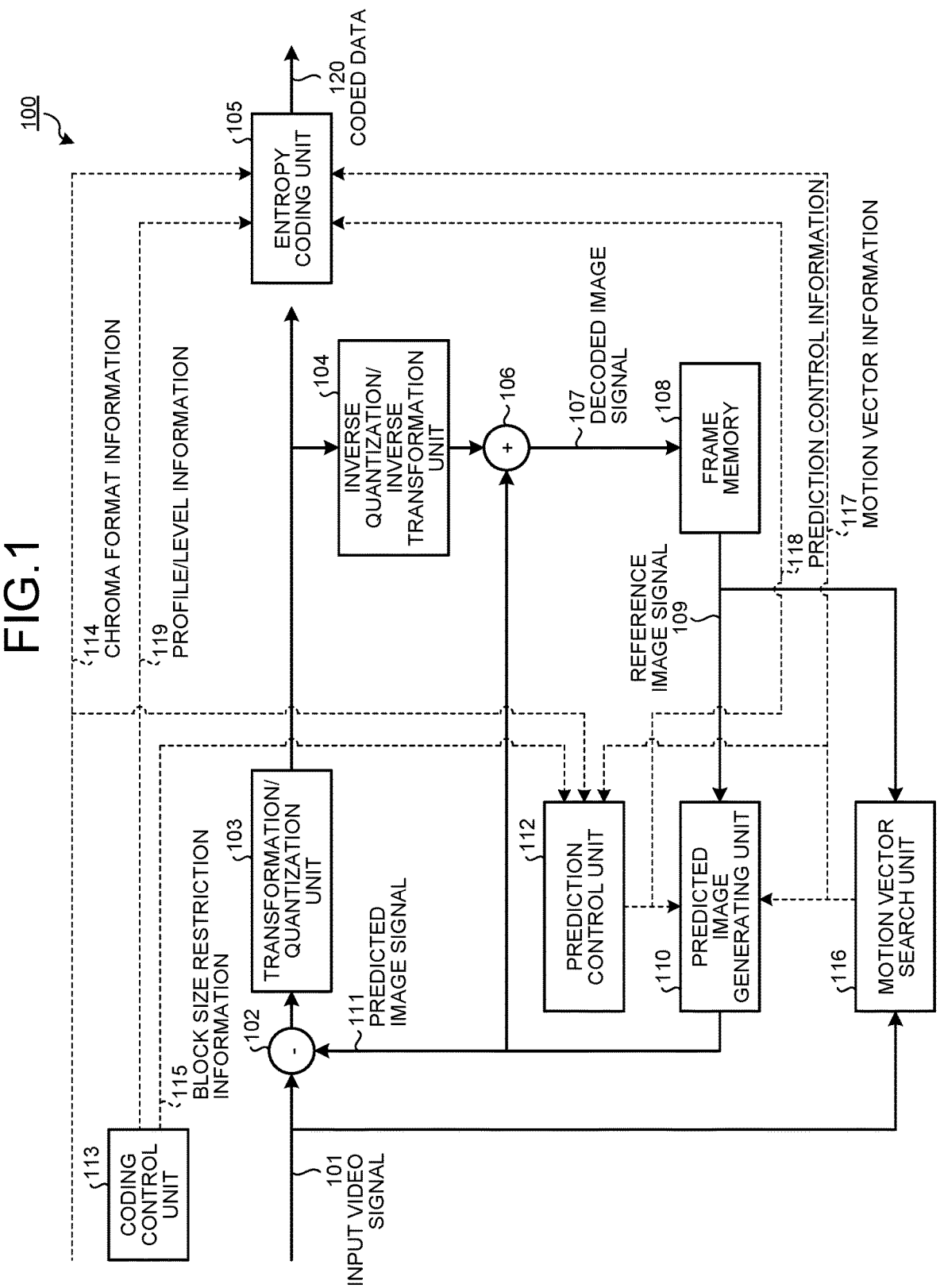
FIG. 1 is a block diagram illustrating an image coding apparatus according to an embodiment.

FIG. 1 is a block diagram illustrating one example of a configuration of an image coding apparatus 100 according to the present embodiment. As illustrated in FIG. 1, the image coding apparatus 100 includes a subtraction unit 102, a transformation/quantization unit 103, an inverse quantization/inverse transformation unit 104, an entropy coding unit 105, an addition unit 106, a frame memory 108, a predicted image generating unit 110, a prediction control unit 112, a coding control unit 113, and a motion vector search unit 116.

The image coding apparatus 100 generates coded data 120 from input video signal 101. For example, the input video signal 101 is input to the image coding apparatus 100 in units o frames. The input video signal 101 is divided into a block that is a macroblock.

The subtraction unit 102 outputs a prediction error signal that is a difference between a predicted image signal 111 generated by the predicted image generating unit 110 and the input video signal 101.

The transformation/quantization unit 103 executes a quantization after executing an orthogonal transformation on prediction error signal with a discrete cosine transformation (DCT), thereby generating quantized transform coefficient information. The quantized transform coefficient information is divided into two. One of the divided information is input to the entropy coding unit 105. The other one is input to the inverse quantization/inverse transformation unit 104.

The inverse quantization/inverse transformation unit 104 executes the inverse quantization and inverse transformation on the quantized transform coefficient information as the process inverse to the processing executed by the transformation/quantization unit 103, thereby reproducing the prediction error signal.

The addition unit 106 adds the prediction error signal and the predicted image signal. According to this process, a decoded image signal 107 is generated. The decoded image signal 107 is input to the frame memory 108.

The frame memory 108 is a memory unit that stores therein a reference image signal. The frame memory 108 executes a filtering process or the other process on the decoded image signal 107, and then, determines whether the decoded image signal 107 is stored or not for allowing the decoded image signal 107 to become the reference image signal 109 input to the predicted image generating unit 110. The reference image signal 109 is input to the predicted image generating unit 110 and to the motion vector search unit 116.

The motion vector search unit 116 generates motion vector information 117 from the input video signal 101 and the reference image signal 109. The motion vector information 117 is input to the predicted image generating unit 110, and also transmitted to the entropy coding unit 105.

The predicted image generating unit 110 generates the predicted image signal 111 from the reference image signal 109, the prediction control information 118, and the motion vector information 117.

The coding control unit 113 inputs block size restriction information 115 to the prediction control unit 112, and transmits profile/level information 119 to the entropy coding unit 105.

The profile/level information 119 includes profile information indicating a combination of coding tool groups, and level information that is restriction information of the image coding apparatus according to the processing power of the image decoding apparatus. The level information indicates a restriction combination of a maximum number of macroblocks per hour, the maximum number of macroblocks per frame, the maximum search range of vector, and the number of vectors in two consecutive macroblocks.

For example, H.264 specifies profile information such as a base line profile, a main profile, and high profile. H.264 also specifies 16 level information.

In the present embodiment, parameters are specified using the profile/level information. The parameters includes a parameter specifying as to whether the memory bandwidth reducing method is applied or not, the restriction value of the block size (block size restriction information 115), and a restriction method. These parameters may be specified by using information other than the profile/level information.

The block size restriction information 115 is information specifying a threshold value (the restriction value of the block size) used for the determination of the block size. For example, the coding control unit 113 sets different block size restriction information 115 according to the profile/level information. The block size restriction information 115 may be included in the profile/level information.

The prediction control unit 112 controls the predicted image generation executed by the predicted image generating unit 110 according to the block size restriction information 115 input from the coding control unit 113, chroma format information 114 of the input video signal 101, and the motion vector information 117 input from the motion vector search unit 116 (the detail will be described later). The prediction control unit 112 generates the prediction control information 118 used for the control of the predicted image generation. The prediction control information 118 is input to the predicted image generating unit 110, and also transmitted to the entropy coding unit 105.

The entropy coding unit 105 performs an entropy coding on the coding information to generate the coded data 120 according to a prescribed syntax. The coding information includes, for example, the quantized transform coefficient information input from the transformation/quantization unit 103, the chroma format information 114 of the input video signal, the motion vector information 117 input from the motion vector search unit 116, the prediction control information 118 input from the prediction control unit 112, and the profile/level information 119 input from the coding control unit 113.

Here, the chroma format information 114 will be described. The chroma format information 114 is information indicating a chroma format of the input video signal 101. FIG. 2 is a view illustrating one example of the chroma format information 114. FIG. 2 illustrates an example in which chroma_format_idc used in H.264 is used as the chroma format information 114.

chroma_format_idc=0 indicates a monochrome format only with luminance. chroma_format_idc=1 indicates 4:2:0 format in which the color difference is sampled at half horizontally and vertically with respect to the luminance. chroma_format_idc=2 indicates 4:2:2 format in which the color difference is sampled at half only horizontally with respect to the luminance. chroma_format_idc=3 indicates 44:4 format in which the luminance and the color difference have the same pixel number.

The horizontal size of the prediction block of the luminance signal is defined as nPSW, and the vertical size is defined as nPSH. In 4:2:0 format, the horizontal size of the blocks of the color difference signals Cb and Cr is nPSW/2, while the vertical size is nPSH/2. In 4:2:2 format, the horizontal size of the blocks of the color difference signals Cb and Cr is nPSW/2, while the vertical size is nPSH. In 44:4 format, the horizontal size of the blocks of the color difference signals Cb and Cr is nPSW, while the vertical size is nPSH.

Next, the relationship between the chroma format and the interpolation will be described.

Figure 3:
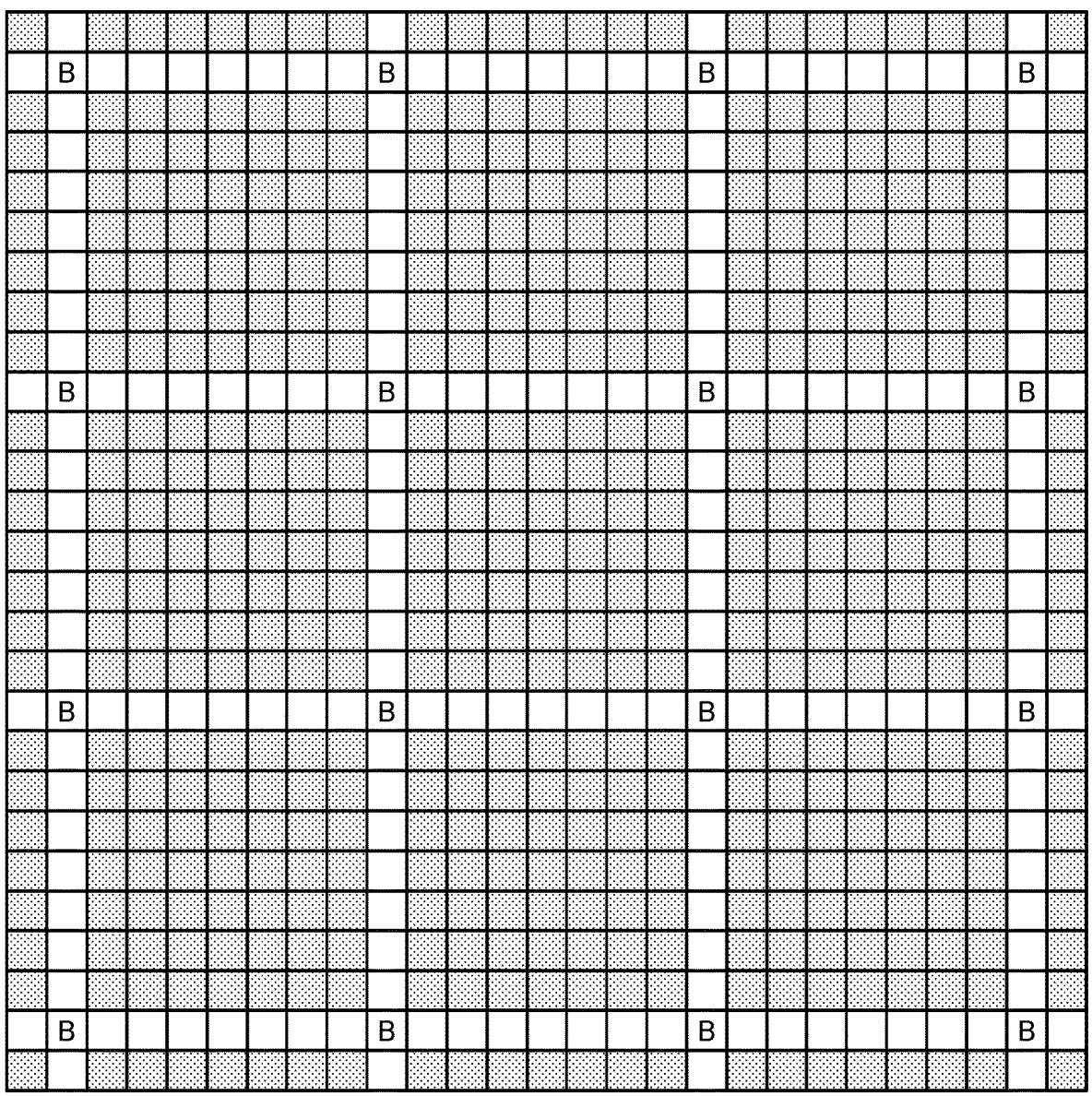
FIG. 3 is a view of a motion vector with a color difference signal in 4:2:0 format.

FIG. 3 is a view illustrating the position of the motion vector in an interpolation image with 1/8-pel accuracy of the color difference signal in 4:2:0 format. "B" is a position of an integer pixel of the color difference signal, which is the position of the motion vector that does not need the interpolation. White portions indicate the position of the motion vector that needs a one-dimensional interpolation for the color difference signal only horizontally or only vertically. Light shaded portions indicate the position of the motion vector that needs a two-dimensional interpolation for performing the interpolation to the color difference signal both horizontally and vertically.

Figure 4:
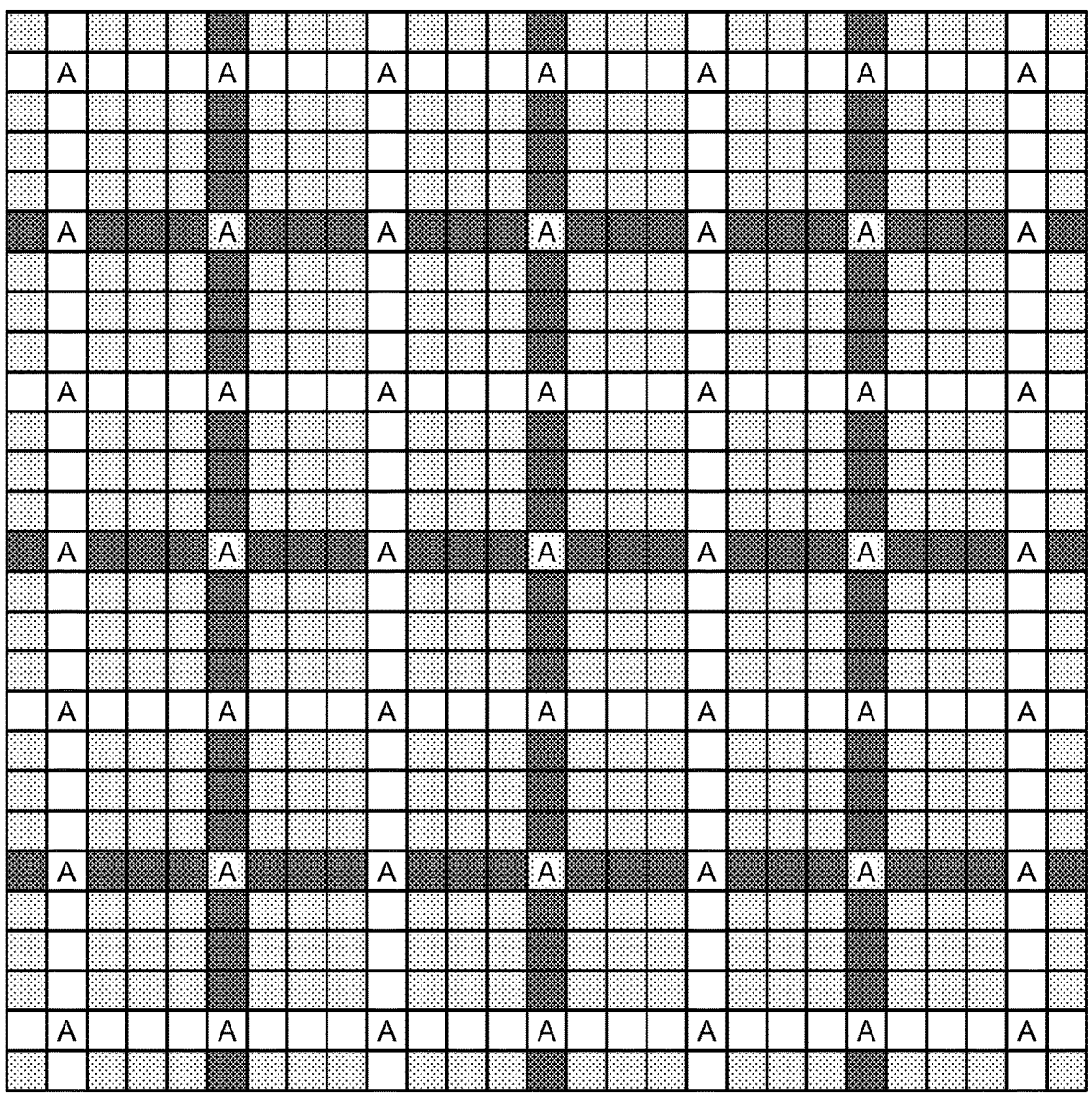
FIG. 4 is a view of a motion vector with a luminance signal in 4:2:0 format.

FIG. 4 is a view illustrating the position of the motion vector in an interpolation image with 1/4-pel accuracy of the luminance signal in 4:2:0 format. "A" is the position of the integer pixel of the luminance signal, which is the position of the motion vector that does not need the interpolation. White portions with "A" indicate the position of the motion vector that does not need the interpolation for both the luminance signal and the color difference signal. Light shaded portions with "A" indicate the position of the motion vector that does not need the interpolation for the luminance signal but needs the interpolation for the color difference signal.

The white portions without "A" indicate the position of the motion vector that needs the one-dimensional interpolation for the luminance signal and the color difference signal only horizontally or only vertically. The light shaded portions without "A" indicate the position of the motion vector that needs the two-dimensional interpolation in which the interpolation processing is performed horizontally and vertically for the luminance signal and the color difference signal. Dark shaded portions indicate the position of the motion vector that needs the one-dimensional interpolation only horizontally or only vertically for the luminance signal, and needs the two-dimensional interpolation in which the interpolation is executed horizontally and vertically for the color difference signal.

Figure 5:
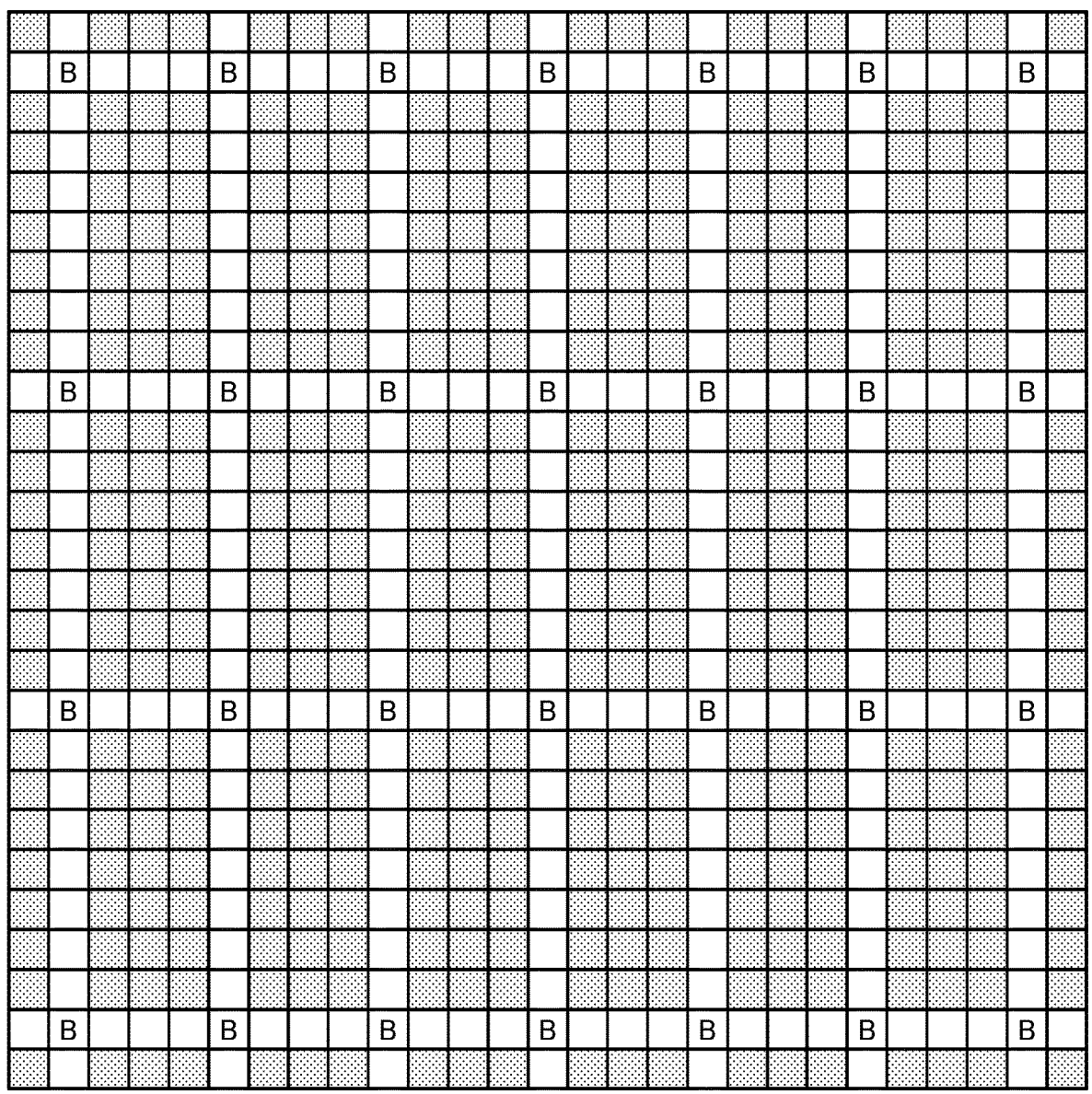
FIG. 5 is a view of a motion vector with a color difference signal in 4:2:2 format.

FIG. 5 is a view illustrating the position of the motion vector in an interpolation image with 1/4-pel accuracy of the color difference signal in the horizontal direction, and with 1/8-pel accuracy of the color difference signal in the vertical direction in 4:2:2 format. "B" is the position of the integer pixel of the color difference signal, which is the position of the motion vector that does not need the interpolation. White portions indicate the position of the motion vector that needs the one-dimensional interpolation for the color difference signal only horizontally or only vertically. Light shaded portions indicate the position of the motion vector that needs the two-dimensional interpolation for performing the interpolation to the color difference signal horizontally and vertically.

Figure 6:
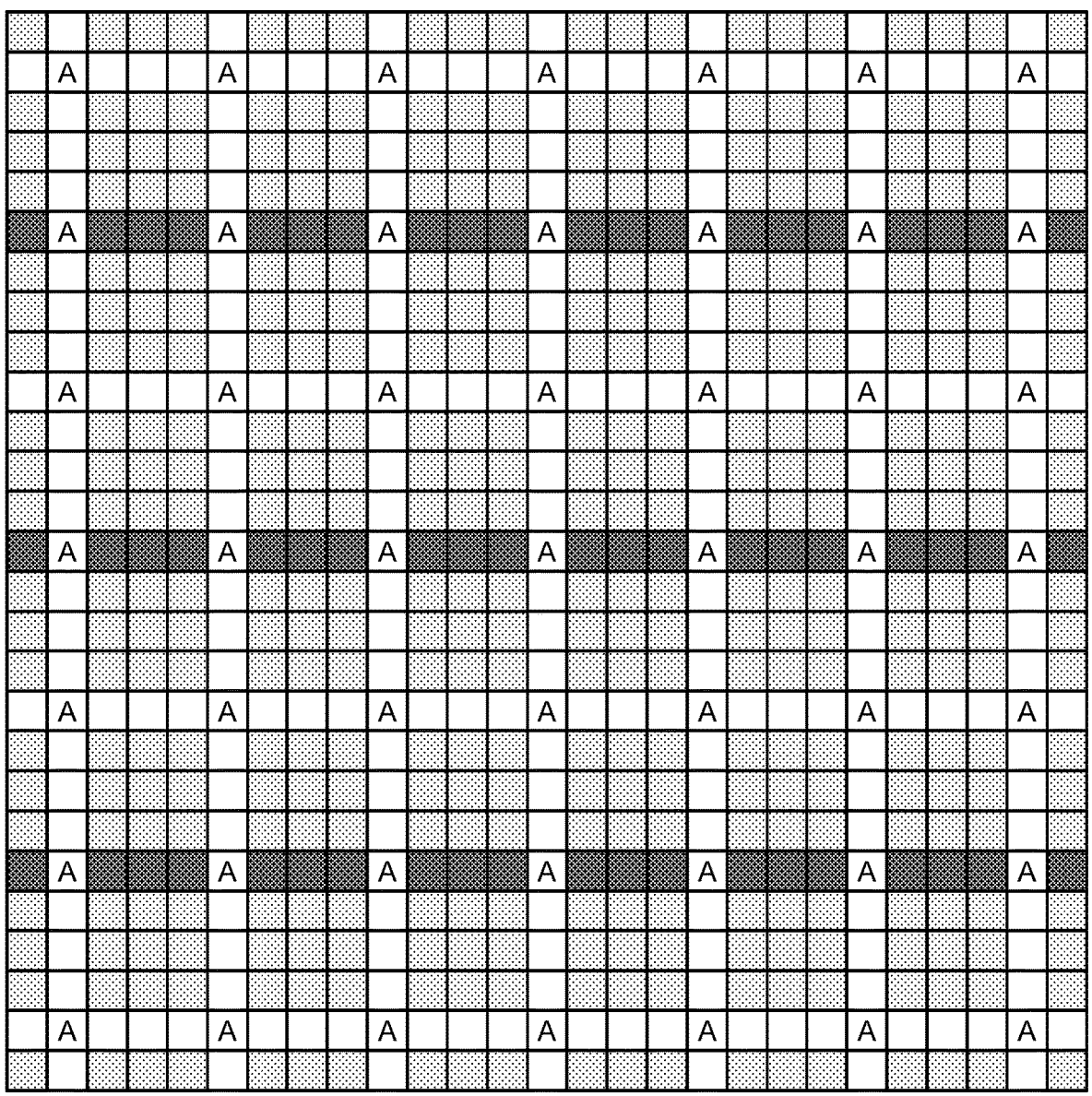
FIG. 6 is a view of a motion vector with a luminance signal in 4:2:2 format.

FIG. 6 is a view illustrating the position of the motion vector in an interpolation image with 1/4-pel accuracy of the luminance signal in 4:2:2 format. "A" is the position of the integer pixel of the luminance signal, which is the position of the motion vector that does not need the interpolation for the luminance signal. White portions with "A" indicate the position of the motion vector that does not need the interpolation for both the luminance signal and the color difference signal. Light shaded portions with "A" indicate the position of the motion vector that does not need the interpolation for the luminance signal but needs the interpolation for the color difference signal.

The white portions without "A" indicate the position of the motion vector that needs the one-dimensional interpolation for the luminance signal and the color difference signal only horizontally or only vertically. The light shaded portions without "A" indicate the position of the motion vector that needs the two-dimensional interpolation in which the interpolation is performed horizontally and vertically for the luminance signal and the color difference signal. Dark shaded portions indicate the position of the motion vector that needs the one-dimensional interpolation only horizontally for the luminance signal, and needs the two-dimensional interpolation in which the interpolation is executed horizontally and vertically for the color difference signal.

Next, the relationship between the chroma format and the pixel to be accessed in the interpolation will be described.

Figure 7:
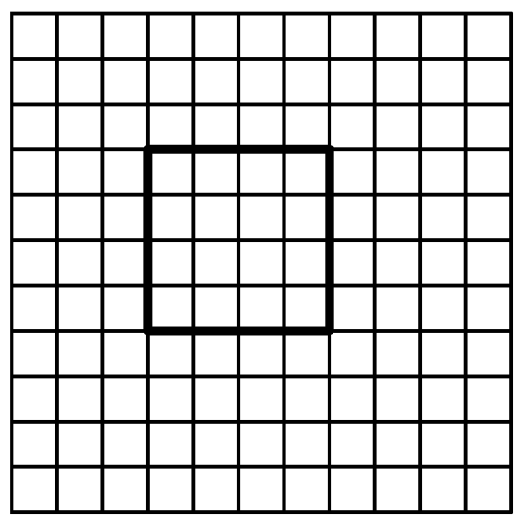
FIG. 7 is a view illustrating an example of pixels that are accessed in 4:2:0 format.
Figure 8:
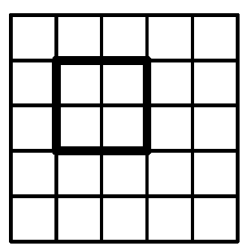
FIG. 8 is a view illustrating an example of pixels that are accessed in 4:2:0 format.

FIGS. 7 and 8 are views illustrating one example of a pixel that is accessed upon generating the interpolation image on the block basis in 4:2:0 format.

FIG. 7 illustrates the maximum number of pixels that have to be accessed upon generating the interpolation image of 4×4 pixel block for the luminance signal with an 8-tap interpolation filter. In the two-dimensional interpolation, three outside pixels on the left and above the pixel block as well as four outside pixels on the right and under the pixel block have to be accessed for generating the interpolation image with 4×4 pixel block. Specifically, 11×11 pixels have to be accessed as a whole. The number of the outside pixels to be accessed depends upon the tap length. Therefore, when the interpolation filter with the same tap is used, the number of accesses per pixel increases more for a smaller block.

FIG. 8 illustrates the maximum number of pixels that have to be accessed upon generating the interpolation image of 2×2 pixel block, corresponding to 4×4 pixel block for the luminance signal, for the color difference signal with a four-tap interpolation filter. In the two-dimensional interpolation, one outside pixel on the left and above the pixel block as well as two outside pixels on the right and under the pixel block have to be accessed for generating the interpolation image with 2×2 pixel block. Specifically, 5×5 pixels have to be accessed as a whole.

Figure 9:
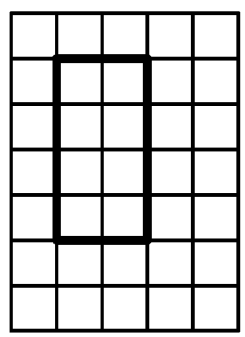
FIG. 9 is a view illustrating an example of pixels that are accessed in 4:2:2 format.

FIG. 9 is a view illustrating one example of a pixel that is accessed upon generating the interpolation image on the block basis in 4:2:2 format. The maximum number of pixels that have to be accessed upon generating the interpolation image of 4×4 pixel block for the luminance signal with a four-tap interpolation filter is the same as the case in FIG. 7, so that the redundant description will not be made.

FIG. 9 illustrates the maximum number of pixels that have to be accessed upon generating the interpolation image of 4×2 pixel block, corresponding to 4×4 pixel block for the luminance signal, for the color difference signal with a four-tap interpolation filter. In the two-dimensional interpolation, one outside pixel on the left and above the pixel block as well as two outside pixels on the right and under the pixel block have to be accessed for generating the interpolation image with 2×2 pixel block. Specifically, 5×7 pixels have to be accessed as a whole.

As illustrated in FIGS. 3 to 6, the necessity of the interpolation is different depending upon the chroma format and the motion vector. Which is needed out of the one-dimensional interpolation and the two-dimensional interpolation is different depending upon the chroma format and the motion vector. As illustrated in FIGS. 7 to 9, the number of pixels to be accessed is different depending upon the chroma format.

In the present embodiment, by referring to the chroma format and the motion vector, the predicted image generation is controlled so that a specific interpolation in which the number of pixels to be accessed in the reference image (reference image signal 109) is large is not executed. The specific interpolation is an interpolation using bi-directional prediction and two-dimensional interpolation. The interpolation in the bi-directional prediction may be defined as the specific interpolation. The specific method for controlling the predicted image generation so as not to execute the specific interpolation will be described later.

Figure 10:
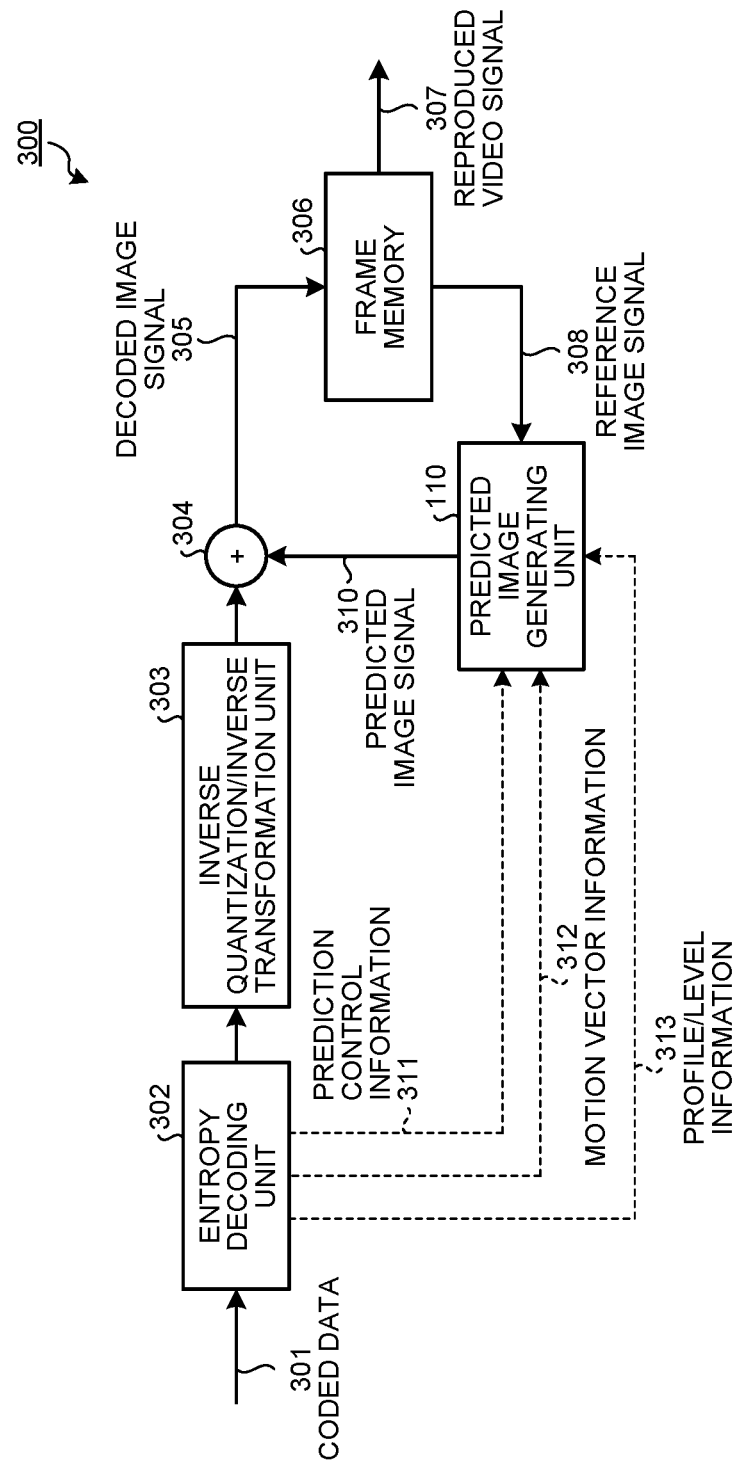
FIG. 10 is a block diagram illustrating an image decoding apparatus corresponding to the image coding apparatus.

FIG. 10 is a block diagram illustrating an example of a configuration of an image decoding apparatus 300 corresponding to the image coding apparatus 100. The image decoding apparatus 300 includes an entropy decoding unit 302, an inverse quantization/inverse transformation unit 303, an addition unit 304, a frame memory 306, and the predicted image generating unit 110.

The image decoding apparatus 300 generates a reproduced video signal 307 from coded data 301.

The entropy decoding unit 302 performs an entropy decoding on the coded data 301 in accordance with a prescribed syntax. The entropy decoding unit 302 decodes the coded data 301 to acquire quantized transform coefficient information, prediction control information 311, motion vector information 312, and profile/level information 313. The decoded quantized transform coefficient information is input to the inverse quantization/inverse transformation unit 303. The decoded prediction control information 311, the motion vector information 312, and the profile/level information 313 are input to the predicted image generating unit 110.

The quantized transform coefficient information, the prediction control information 311, the motion vector information 312, and the profile/level information 313 correspond respectively to the quantized transform coefficient information, the prediction control information 118, the motion vector information 117, and the profile/level information 119, which are coded by the image coding apparatus 100 in FIG. 1.

The inverse quantization/inverse transformation unit 303 executes inverse quantization and inverse orthogonal transformation on the quantized transform coefficient information, thereby reproducing the prediction error signal.

The addition unit 304 adds the prediction error signal and the predicted image signal 310 to generate a decoded image signal 305. The decoded image signal 305 is input to the frame memory 306.

The frame memory 306 executes the filtering process on the decoded image signal 305, and outputs the resultant as the reproduced video signal 307. The frame memory 306 determines whether the decoded image signal 305, which has undergone the filtering process, is stored or not, based upon the prediction control information 311. The stored decoded image signal 305 is input to the predicted image generating unit 110 as a reference image signal 308.

The predicted image generating unit 110 generates the predicted image signal 310 by using the reference image signal 308, the prediction control information 311, and the motion vector information 312.

Figure 11:
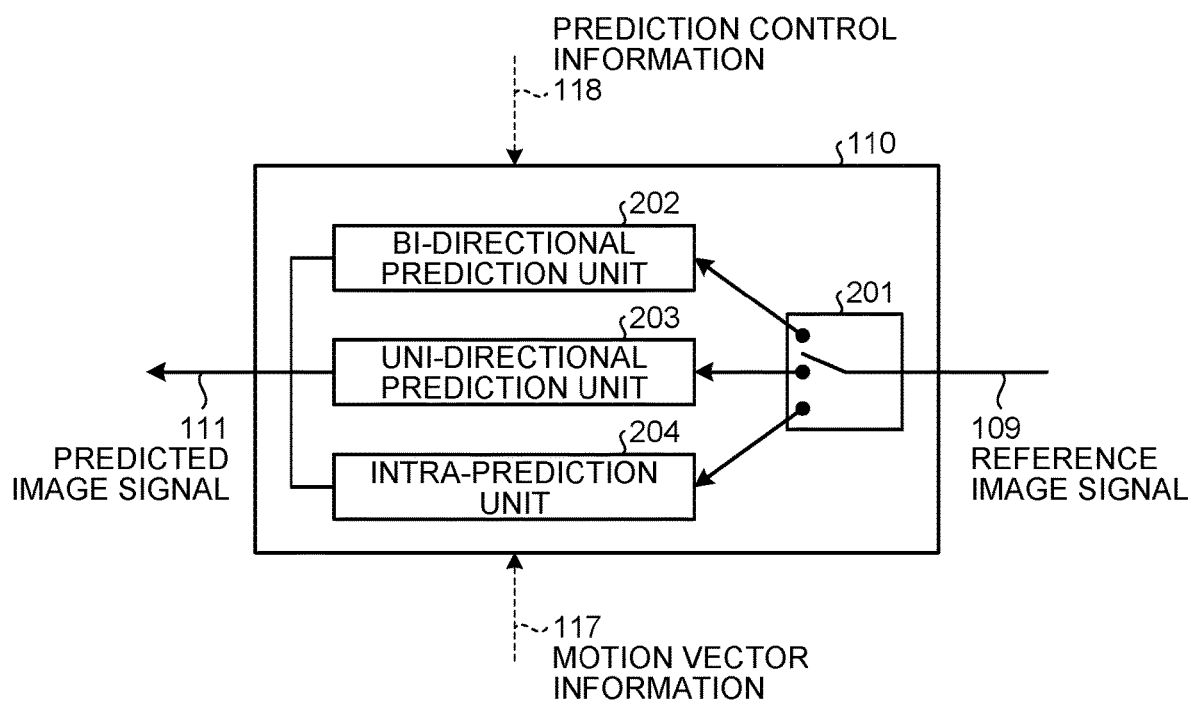
FIG. 11 is a block diagram illustrating a predicted image generating unit.

FIG. 11 is a block diagram illustrating an example of a configuration of the predicted image generating unit 110 mounted to the image coding apparatus 100 and the image decoding apparatus 300. The predicted image generating unit 110 includes a switch 201, a bi-directional prediction unit 202, a uni-directional prediction unit 203, and an intra-prediction unit 204. The predicted image generating unit 110 generates the predicted image signal 111 from the reference image signal 109, the prediction control information 118, and the motion vector information 117.

The prediction control information 118 includes information (prediction mode) for designating which one of the bi-directional prediction unit 202, the uni-directional prediction unit 203, and the intra-prediction unit 204 is used, for example. The switch 201 makes a changeover for selecting any one of the bi-directional prediction unit 202, the uni-directional prediction unit 203, and the intra-prediction unit 204 by referring to this information.

The reference image signal 109 is input to any one of the bi-directional prediction unit 202, the uni-directional prediction unit 203, and the intra-prediction unit 204, which is selected by the switch 201.

When the bi-directional prediction unit 202 is selected, the bi-directional prediction unit 202 generates a motion compensation image signal by using the reference image signal 109 and the motion vector information 117 from plural reference frames, and generates the predicted image signal 111 based upon the bi-directional prediction. The bi-directional prediction unit 202 is selected not only in the case where the prediction mode is explicitly designated as the bi-directional prediction as the coded data but also in the case where the bi-directional prediction is not explicitly designated by the coded data such as a skip mode, a direct mode, and merge mode, but the operation of the bi-directional prediction is implicitly designated by semantics.

When the uni-directional prediction unit 203 is selected, the uni-directional prediction unit 203 generates the motion compensation image signal by using the reference image signal 109 and the motion vector information 117 from a single reference frame, and generates the predicted image signal 111. The uni-directional prediction unit 203 is selected not only in the case where the prediction mode is explicitly designated as the uni-directional prediction as the coded data but also in the case where the uni-directional prediction is not explicitly designated by the coded data such as the skip mode, the direct mode, and the merge mode, but the operation of the uni-directional prediction is implicitly designated by semantics.

When the intra-prediction unit 204 is selected, the intra-prediction unit 204 generates the predicted image signal 111 by using the reference image signal 109 in a screen.

Figure 12:
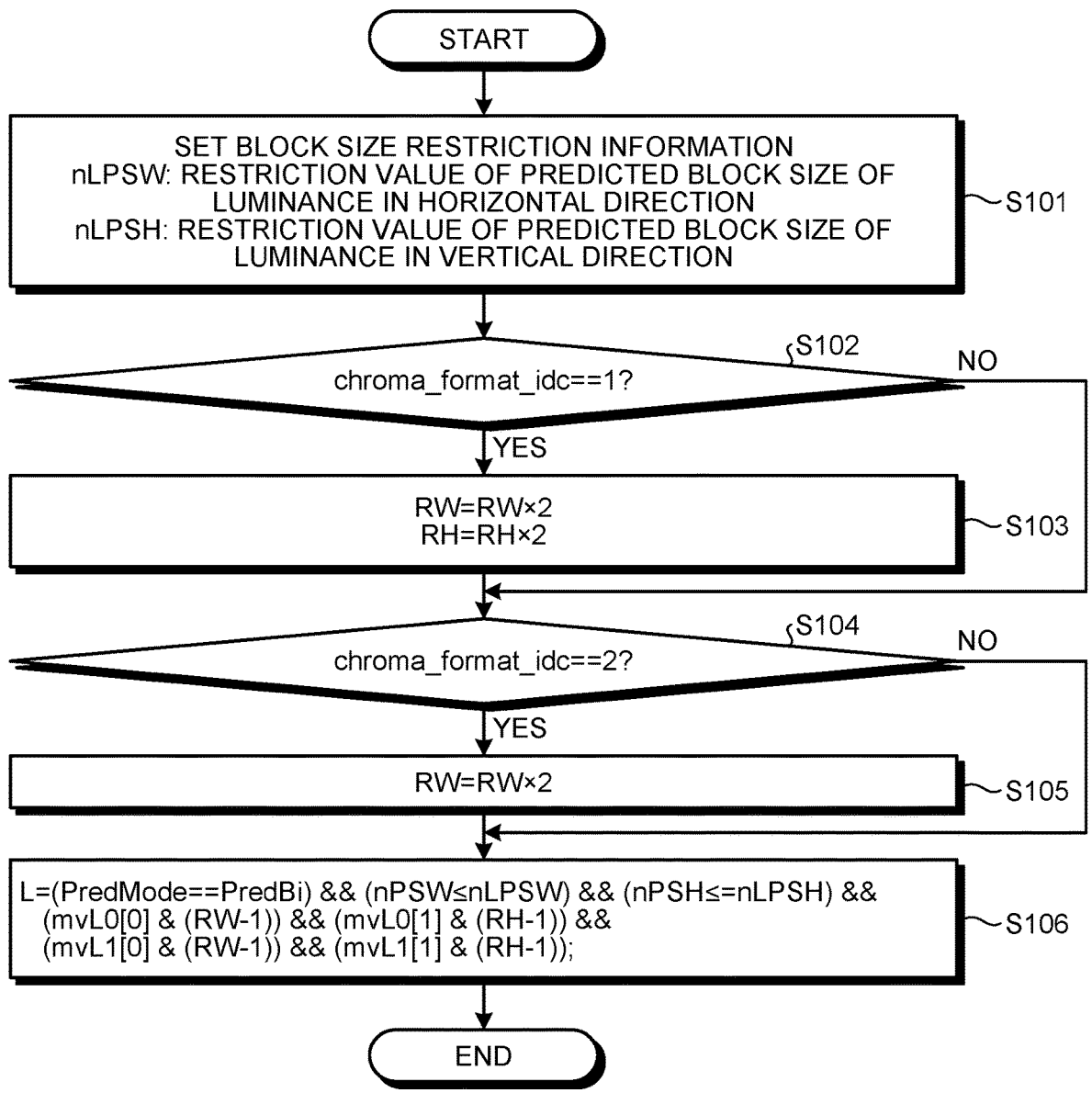
FIG. 12 is a flowchart of control according to the embodiment.

Next, the control for reducing the memory bandwidth by the image coding apparatus 100 thus configured according to the present embodiment will be described with reference to FIG. 12. FIG. 12 is a flowchart illustrating an overall flow of the control in the present embodiment.

The coding control unit 113 sets a restriction value (nLPSW, nLPSH) of the block size according to the profile/level information 119 (step S101). nLPSW is the restriction value of the predicted block size of luminance in the horizontal direction. nLPSH is the restriction value of the predicted block size of luminance in the vertical direction.

When the profile information indicates a specific profile (e.g., high profile of H.264), or when the level information indicates a specific level (e.g., a certain level or higher level), for example, the coding control unit 113 sets the predetermined restriction value (nLPSW, nLPSH) of the block size. The coding control unit 113 may be configured to set stepwise the restriction value of the block size according to the profile information and the level information.

It is supposed below that a variable RW is a motion vector accuracy in the horizontal direction, expressed by 1/RW-pel accuracy. It is also supposed that a variable RH is a motion vector accuracy in the vertical direction, expressed by 1/RHpel accuracy. Initial values of the variable RW and the variable RH are defined as the motion vector accuracy of luminance. A value of a power of two is generally used for RW and RH.

The prediction control unit 112 determines whether the chroma format information (chroma_format_idc) 114 is 1 or not (step S102). In the case of chroma_format_idc=1 (step S102: Yes), the prediction control unit 112 doubles the values of RW and RH (step S103). This is because chroma_format_idc=1 means 4:2:0 format in which the color difference is sampled at half horizontally and vertically with respect to luminance.

In the case where chroma_format_idc=1 is not established (step S102: No), the prediction control unit 112 determines whether the chroma format information (chroma_format_idc) 114 is 2 or not (step S104). In the case of chroma_format_idc=2 (step S104: Yes), the prediction control unit 112 doubles the value of RW (step S105). This is because chroma_format_idc=2 means 4:2:2 format in which the color difference is sampled at half only horizontally with respect to luminance.

When chroma_format_idc assumes other values (step S104: No), the values of RW and RH are not changed.

Next, the prediction control unit 112 calculates a variable L indicating whether the memory bandwidth is restricted or not (step S106). The variable L assuming "true" means that the method of reducing the memory bandwidth is applied, and the variable L assuming "false" means that the method is not applied.

When the prediction is the bi-directional prediction, the prediction block is small, and two motion vectors are fractional accuracy in the color difference, as described above for example, the memory bandwidth to be accessed per pixel increases. Therefore, the prediction control unit 112 calculates the variable L according to the following equation (1).

$$L=(\text{PredMode}==\text{PredBi})\&\& \ (nPSW \leq nLPSW)\&\& \\ (nPSH \leq nLPSH)\&\& \ (mvL0[0]\&(RW-1))\&\& \\ (mvL0[1]\&(RH-1))\&\& \ (mvL1[0]\&(RW-1))\&\& \\ (mvL1[1]\&(RH-1)); \quad (1)$$

The value of the motion vector in the horizontal direction in the list 0 of the block to be processed is defined as mvL0[0], and the value in the vertical direction is defined as mvL0[1]. The value of the motion vector in the horizontal direction in the list 1 is defined as mvL1[0], and the value in the vertical direction is defined as mvL1[1]. PredMode indicates the prediction mode. PredBi indicates the bi-directional prediction. In the description below, the prediction modes of the uni-directional prediction using the motion vectors in the list 0 and in the list 1 are represented as PredL0 and PredL1, respectively.

An example of the equation (1) means a case in which the prediction mode PredMode is PredBi, i.e., the bi-directional prediction unit 202 is selected. (nPSW nLPSW) && (nPSH≤nLPSH) && means the condition in which the prediction block size is equal to or smaller than the block size restriction information. In (mvL0[0] & (RW−1)) &&, (mvL0[1] & (RH−1)) &&, (mvL1[0] & (RW−1)) &&, and (mvL1[1] & (RH−1)), it is checked whether the two motion vectors L0 and L1 are not subjected to the two-dimensional interpolation for the color difference, i.e., whether the lower bit of the motion vector expresses the accuracy after the decimal point. "&" means a bit operator according to the notation in the C language, and expresses bitwise OR.

The conditional equation for calculating the variable L is not limited to the equation (1). For example, it may independently be determined even for the prediction modes (PredL0, PredL1) other than PredBi as in an equation (2).

$$L=(nPSW \leq nLPSW)\&\&(nPSH \leq nLPSH)\&\& \\ ((\text{PredMode}==\text{PredBi})\&\& \ (mvL0[0]\&(RW-1)) \\ \&\& \ (mvL0[1]\&(RH-1))\&\& \ (mvL1[0]\&(RW-1)) \\ \&\& \ (mvL1[1]\&(RH-1))||((\text{PredMode}==\text{PredL0}) \\ \&\& \ (mvL0[0]\&(RW-1))\&\& \ (mvL0[1]\&(RH-1)) \\ ||((\text{PredMode}==\text{PredL1})\&\& \ (mvL1[0]\&(RW-1)) \\ \&\& \ (mvL1[1]\&(RH-1))))); \quad (2)$$

As in an equation (3), the restriction value (nLPSW1, nLPSH1) of the block size for the uni-directional prediction (PredL0 or PredL1) may separately be set. Specifically, the block size restricted in the uni-directional prediction and the block size restricted in the bi-directional prediction may be different from each other.

$$L=((\text{PredMode}==\text{PredBi})\&\& \ (nPSW \leq nLPSW)\&\& \\ (nPSH \leq nLPSH)\&\& \ (mvL0[0]\&(RW-1))\&\& \\ (mvL0[1]\&(RH-1))\&\& \ (mvL1[0]\&(RW-1))\&\& \\ (mvL1[1]\&(RH-1))||((nPSW \leq nLPSW1)\&\& \\ (nPSH \leq nLPSH1))||((\text{PredMode}==\text{PredL0})\&\& \\ (mvL0[0]\&(RW-1))\&\& \ (mvL0[1]\&(RH-1))\&\& \\ ((\text{PredMode}==\text{PredL1})\&\& \ (mvL1[0]\&(RW-1)) \\ \&\& \ (mvL1[1]\&(RH-1))); \quad (3)$$

When the prediction block size is equal to or smaller than the restriction value (nLPSW, nLPSH) of the block size as in an equation (4), two motion vectors may be restricted to access only to the integer pixel in the color difference during the bi-directional prediction.

$$L=((\text{PredMode}==\text{PredBi})\&\& \ (nPSW \leq nLPSW)\&\& \\ (nPSH \leq nLPSH)\&\& \ !((mvL0[0]\&(RW-1)==0) \\ \&\& \ (mvL0[1]\&(RH-1)==0)\&\& \ (mvL1[0]\& \\ (RW-1)==0)\&\& \ (mvL1[1]\&(RH-1)==0))); \quad (4)$$

Whether the value of the motion vector is restricted, or under what condition the value of the motion vector is restricted is distinguished by the profile/level information 119.

Figure 13:
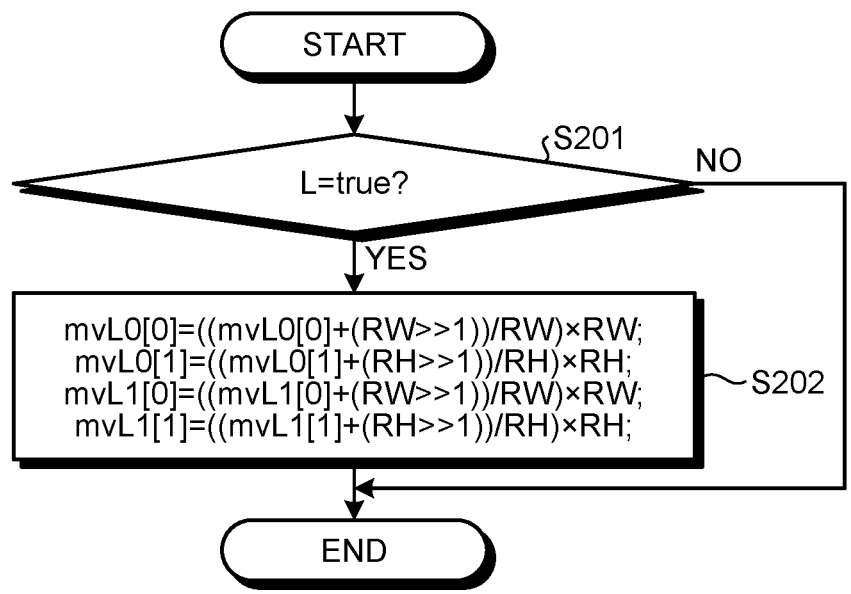
FIG. 13 is a flowchart of a process of reducing a memory bandwidth.

Next, the specific method of reducing the memory bandwidth will be described. FIG. 13 is a flowchart illustrating one example of the process of reducing the memory bandwidth. FIG. 13 illustrates one example of a method of restricting the value of the motion vector, as the method of reducing the memory bandwidth.

The prediction control unit 112 determines whether the variable L is "true" or not (step S201). If the variable L is "true" (step S201: Yes), the prediction control unit 112 transforms the values L0 and L1 of two motion vectors as in an equation (5) (step S202).

$$mvL0[0]=((mvL0[0]+(RW>>1))/RW)\times RW; \ mvL0[1]= \\ ((mvL0[1]+(RH>>1))/RH)\times RH; \ mvL1[0]= \\ ((mvL1[0]+(RW>>1))/RW)\times RW; \ mvL1[1]= \\ ((mvL1[1]+(RH>>1))/RH)\times RH; \quad (5)$$

">>" indicates an arithmetic right shift according to the notation in the C language. "/" indicates a division in integer arithmetic. "×" indicates a multiplication in integer arithmetic. The bit corresponding to the interpolation accuracy of the color difference signal of two motion vectors L0 and L1 are rounded by the equation (5) to become 0. With this process, the two-dimensional interpolation is not executed, whereby the reduction in the memory bandwidth can be achieved.

The general rounding method is described here. However, the other method may be used. For example, rounding down method, rounding up method, and a method of rounding to the nearest even number may be employed.

The motion vector information 117 whose value is changed is coded in the entropy coding unit 105, and output as the coded data. The method in FIG. 13 is for controlling the motion vector information 117 by restricting the value of the motion vector, so as not to generate the coded data by which the memory bandwidth increases.

Alternatively, instead of coding the motion vector information 117 whose value is changed in the entropy coding unit 105, the motion vector information 117 before the change may be coded by the entropy coding unit. In this case, the predicted image generating unit 110 in the image decoding apparatus 300 determines whether the method of reducing the memory bandwidth is applied or not in the process same as that in FIG. 12. When it is applied, the predicted image generating unit 110 in the image decoding apparatus 300 restricts the motion vector by the same manner as in FIG. 13.

The method of transforming the value of the motion vector is not limited to the method of rounding the value corresponding to the interpolation accuracy of the color difference as in the equation (4). The value may be rounded separately for the luminance and the color difference. Specifically, during the interpolation for the luminance, the value corresponding to the interpolation accuracy of the luminance may be rounded, while the value corresponding to the interpolation accuracy of the color difference may be rounded during the interpolation processing for the color difference. This method is for not generating the predicted image that increases the memory bandwidth, when the image coding apparatus 100 and the image decoding apparatus 300 are configured in advance in a manner to execute the same operation.

Figure 14:
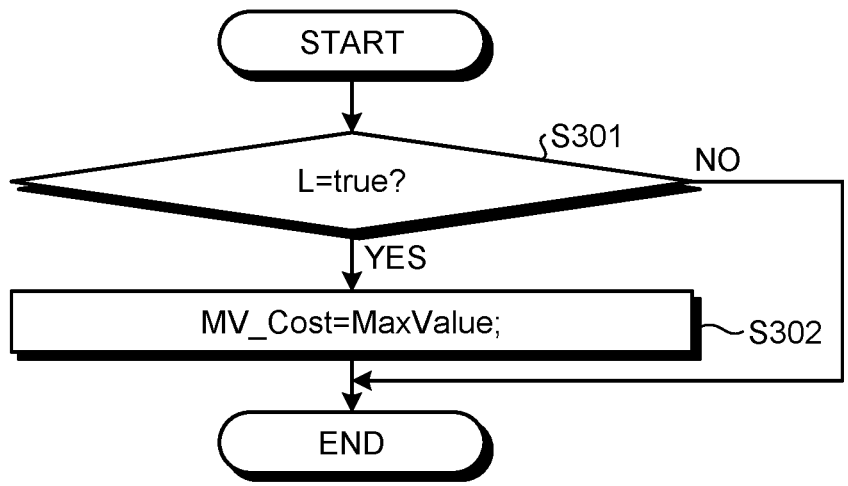
FIG. 14 is a flowchart of a process of reducing a memory bandwidth.

FIG. 14 is a flowchart illustrating another example of the process of reducing the memory bandwidth. FIG. 14 illustrates another example of the method of restricting the value of the motion vector.

In this example, the prediction control unit 112 and the predicted image generating unit 110 calculate cost for selecting the prediction mode, the predicted block size, and the motion vector. They preferentially select the prediction mode, the predicted block size, and the motion vector, which are small in cost, whereby the optimum combination can be selected.

A variable MV_Cost indicating the cost for the motion vector is calculated by using a sum of absolute distance (SAD) of predicted residual errors, a code amount of the motion vector information (MV_Code), and a Lagrange multiplier (a) calculated from the quantized information as in an equation (6).

$$MV\_Cost = SAD + \lambda \times MV\_Code \quad (6)$$

If the variable L is "true" (step S301: Yes), the prediction control unit 112 substitutes the predetermined maximum value MaxValue into the variable MV_Cost indicating the cost for the motion vector (step S302). With this process, the prediction control unit 112 controls not to select the motion vector having the large memory bandwidth (step S301).

In the method in FIG. 14, the value of the motion vector is restricted to control the motion vector information 117, so as not to generate the coded data by which the memory bandwidth increases, as in FIG. 13.

Figure 15:
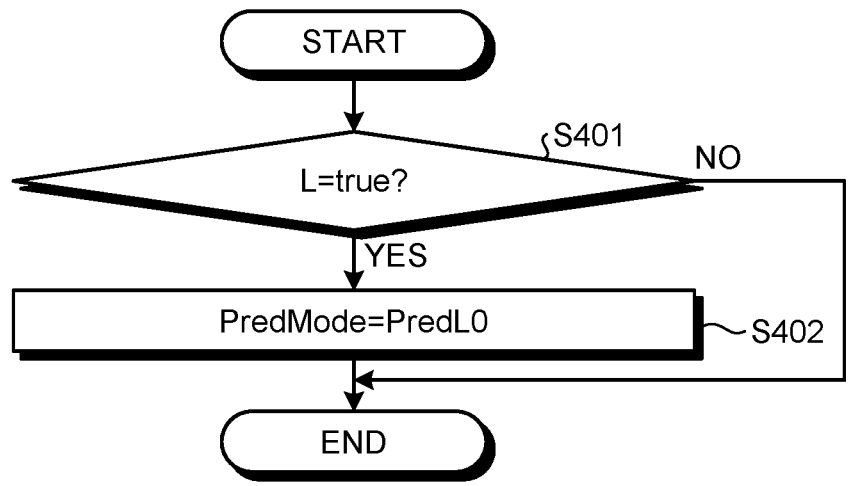
FIG. 15 is a flowchart of a process of reducing a memory bandwidth.

FIG. 15 is a flowchart illustrating another example of the method of reducing the memory bandwidth. FIG. 15 illustrates a method of controlling the prediction mode of the color difference, as another method of reducing the memory bandwidth.

If the variable L is "true" (step S401), only the prediction mode PredMode of color is forcibly rewritten to the uni-directional prediction PredL0 (step S402). With this process, the case of the bi-directional prediction with the color difference signal using large memory bandwidth can be restricted.

The prediction mode in which the prediction mode is forcibly rewritten may be the uni-directional prediction PredL1. What prediction mode is restricted is determined according to the profile/level information 119.

As described above, according to the present embodiment, the memory bandwidth upon generating the motion-compensated interpolation image during the image coding and image decoding can be reduced.

Figure 16:
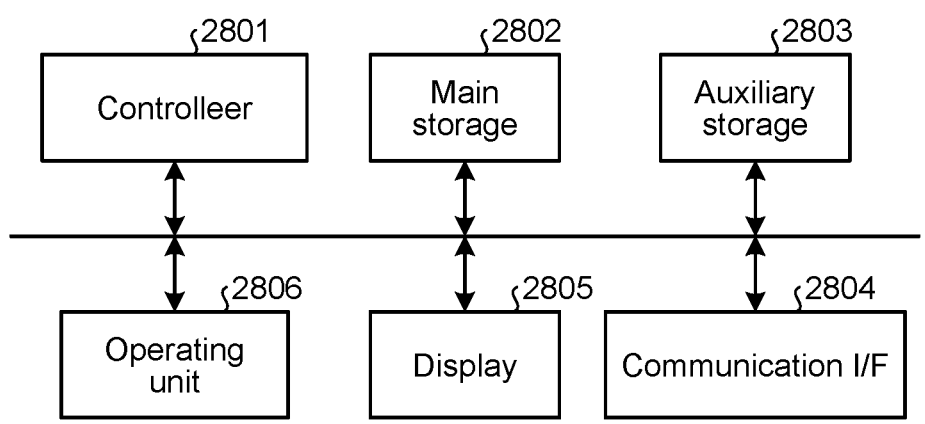
FIG. 16 is a diagram illustrating a hardware configuration of the apparatus according to the embodiment.

Next, a hardware configuration of the apparatus (the image coding apparatus, and the image decoding apparatus) according to the present embodiment will be described with reference to FIG. 16. FIG. 16 is an explanatory view illustrating a hardware configuration of the apparatus according to each of the embodiments. The image encoding apparatus and the image decoding apparatus each comprise a control unit 2801, such as a CPU (Central Processing Unit) which controls the overall apparatus, a main storage 2802, such as a ROM (Read Only Memory) or a RAM (Random Access Memory) which stores various data or programs, an auxiliary storage 2803, such as an HDD (Hard Disk Drive) or a CD (Compact Disk) drive which stores various data or programs, and a bus connecting these elements. This is a hardware configuration utilizing a conventional computer. Further, the image encoding apparatus and the image decoding apparatus are connected wirelessly or through a wire to a communication I/F (Interface) 2804 which controls communication with an external apparatus, a display 2805 which displays information, and an operating unit 2806, such as a keyboard or a mouse which receives instructions input by the user. Data to be encoded and data to be decoded may be stored in the HDD, or input by the disk drive apparatus, or input externally via the communication I/F 2804.

The hardware configuration shown in FIG. 16 is a mere example. The image encoding apparatus and the image decoding apparatus of each embodiment may be implemented partly or entirely by an integrated circuit such as an LSI (Large Scale Integration) circuit or an IC (Integrated Circuit) chip set. The functional blocks of the image encoding apparatus and the image decoding apparatus may be individually formed of a processor, or may be integrated partly or entirely as a processor. Integration of the circuits of the configuration is not limited to LSI, but may be implemented as a dedicated circuit or a general-purpose processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
 a non-transitory computer readable medium and a processor, the processor being configured to encode data of coefficient information acquired from a prediction error indicating a difference between a predicted image and a target image including a luminance component and color difference components,
 wherein the processor is further configured to generate the predicted image by interpolating the luminance component and the color difference components in a reference image according to a motion vector, and wherein, if a size of a block, which is designated as a unit of the interpolation, is equal to or smaller than a predetermined first threshold value, the processor inhibits a bi-directional prediction, and performs only a uni-directional prediction to generate the predicted image according to the motion vector.

* * * * *